Patented Dec. 14, 1943

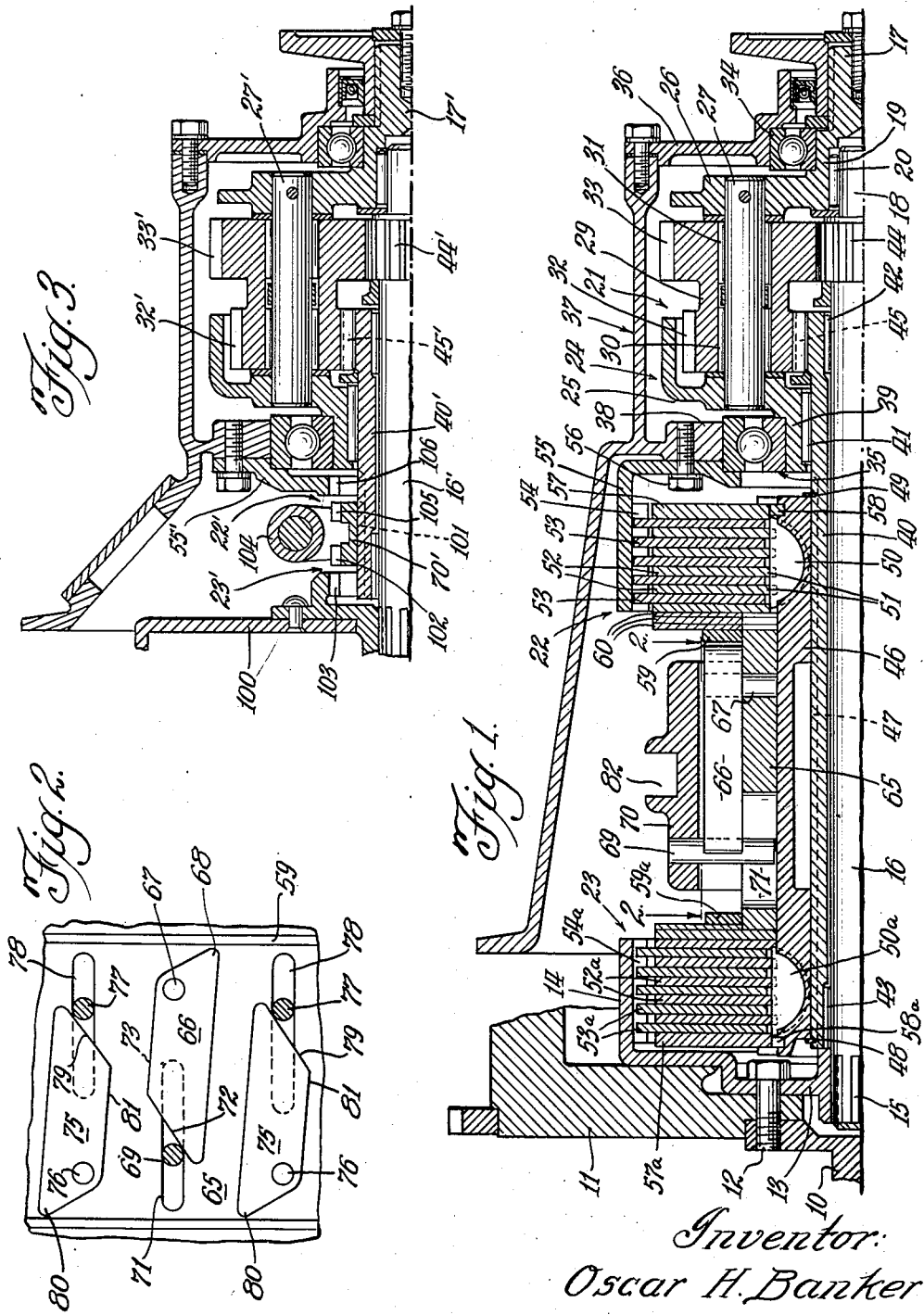

2,336,459

UNITED STATES PATENT OFFICE 2,336,459

REVERSING GEAR

Oscar H. Banker, Evanston, Ill., assignor to New Products Corporation, Chicago, Ill., a corporation of Delaware Application October 20, 1941, Serial No. 415,708

1 Claim. (Cl. 74—298)

The present invention relates generally to reversing gear apparatus and has to do more in particular with such an apparatus wherein there is a planetary gear unit and clutch means for selectively securing a rotatable element of this unit against rotation to obtain opposite rotation of drive and driven members, or for securing said element to one of said members to convert said unit into a direct driving coupling between the drive and driven members. While the apparatus is especially useful in marine installations, between the power plant and the propeller of engine-driven craft, it is susceptible to other use.

The invention contemplates as an important object, the provision of an improved simplified quiet running reversing gear of the planetary type together with clutch means disengageable to disrupt all driving connections between drive and driven shafts, thus placing the gear in neutral, and alternatively engageable to hold a part of the planetary system against rotation to obtain reverse drive of the driven shaft at nearly the same speed as the drive shaft, or to connect such part with another part of the planetary system for converting the same into a direct coupling device between said shafts.

Another important object of this invention is the provision of a reversing gear of the planetary type wherein there are clutches alternatively engageable to bring respective parts into a condition of substantial relative non-rotation to establish forward or reverse drive connection, and wherein the clutches are of a character to gradually effect the non-rotative condition, whereby a shift between forward and reverse drive is expedited and the need for a main disconnect clutch between the power plant and the drive shaft is avoided.

Another object is the provision of a reversing gear according to the first recited object and employing jaw clutches in the creation of an effective economically produced structure.

Still another object of this invention is the provision of a reversing gear of the planetary type that is operable to transmit power without incuring any substantial difference in the speed of driving and driven members between which it is connected.

The above and other desirable objects inherent in and encompassed by the invention will become apparent when fully understanding the preferred embodiment thereof hereinafter described and shown in the accompanying drawing, wherein:

Fig. 1 is a sectional view taken axially through the upper half of a reversing gear constructed according to the principles of the present invention;

Fig. 2 is a fragmentary view showing parts of a cam control for forward and reverse clutches and taken upon the line 2—2 of Fig. 1; and Fig. 3 is a view like Fig. 1 showing a modified form of the invention wherein jaw clutches are employed.

Referring first to Figs. 1 and 2 where the first embodiment of the invention is shown, and particularly to Fig. 1, this form of reversing gear is illustrated in association with a shaft 10 such as the crankshaft of an engine and upon which there is the usual flywheel 11 held in place by a plurality of bolts 12 of which one appears. These bolts also serve to connect a hub portion 13 of a friction clutch drive member 14 with the shaft 10. Said hub portion 13 is splined at 15 to a drive shaft 16 which is arranged in coaxial end-to-end relation with a driven shaft 17. A reduced back end portion 18 of the drive shaft is piloted within a recessed enlarged front end section 19 of the driven shaft, said portion 18 riding upon a set of needle bearings 20 within said shaft portion 19.

The shafts 16 and 17 are operably connectible through a planetary gear unit 21 either in such a fashion as to cause the driven shaft 17 to be rotated reversely with respect to the drive shaft 16 at reduced speed or for causing the shafts to be connected together for rotation in unison. As will be presently explained, when a clutch generally designated 22 is closed, the planetary gear unit 21 will operate to impart the aforesaid reverse rotation to the driven shaft and when a clutch 23 is closed the gears of the planetary gear unit will be locked against relative rotation whereby such unit acts as a coupling device for directly connecting the shafts 16 and 17 to rotate in unison. When neither of the clutches 22 or 23 is closed, the apparatus will be in neutral so no power will be transmitted from the drive shaft to the driven shaft.

The planetary gear unit comprises a planet gear carrier 24 having a disc-like front end plate 25, a disc-like back end plate 26 integral with the driven shaft 17 and a plurality of circumferentially spaced planet gear shafts 27 extending between and anchored in said end plates 25 and 26. Each shaft 27 has a gear cluster 29 journalled thereon upon needle bearing sets 30 and 31 and each cluster comprises relatively small and large diameter gears 32 and 33. The gears 32 taken collectively constitute one planetary gear set while the gears 33 likewise constitute a second planetary gear set. Sufficient space is provided between adjacent gear clusters for the accommodation of means (not shown), for holding the carrier plates 25 and 26 rigidly in the spaced apart relation shown.

The carrier 24 is rotatively supported upon ball-bearing units 34 and 35 respectively in a back wall 36 of the gear box 37 and in a front wall 38 thereof. A hub portion 39 of the front carrier plate 25 is carried in the inner race of the ball-bearing unit 35 and in turn provides a journalled support for a sleeve shaft 40 which is rotatively carried upon needle bearings 41 in said hub portion 39. Additional sets of needle bearings 42 and 43 are provided between back and front end portions of said sleeve shaft 40 and sections of the drive shaft 16. A sun gear 44 integral with the drive shaft 16 meshes with the planet gear set consisting of the gears 33 whereas a sun gear 45 integral with the sleeve shaft 40 meshes with the planet gears 32 constituting the other planet gear set.

A clutch sleeve 46 is splined to the sleeve shaft 40 at an exterior splined section 47 and said sleeve 46 is held against axial movement upon said sleeve shaft by snap rings 48 and 49. A plurality of key-like members 50 are secured to the back end of the clutch sleeve 46 in circumferentially spaced relation. These members 50 fit into notches 51 of a plurality of plates 52 of the clutch 22 which are disposed between clutch plates 53 having notches (not shown) in their outer circumferential periphery that receive ribs 54 spaced circumferentially about a cylindrical member 55 secured to the gear box by bolts 56. The clutch plates 52 and 53 are slidable axially respectively upon the key members 50 and upon the ribs 54 to enable them to be pressed together for engaging the clutch or to be released for effecting clutch disengagement. A pressure plate 57 held upon the back end of the clutch sleeve 46 by a snap ring 58 serves as a reaction member cooperable with a pressure ring 59 which is operable through a stack of spacer rings 60 for compressing the clutch plates to effect clutch engagement.

At the opposite or front end of the clutch sleeve 46 the clutch 23 is made up of parts functioning similarly to and respectively corresponding to the parts just described in the clutch 22 and to expedite this disclosure these corresponding parts of the clutch 23 are identified by the same reference characters with the letter $a$ appended.

Control means for the clutches 22 and 23 includes a cylindrical member 65 surrounding and fixed upon the clutch sleeve 46. There are two sets of clutch engaging levers mounted about the external periphery of the cylindrical member 65. One set of these levers, of which one lever is shown at 66 in each of Figs. 1 and 2, is actuatable to engage the clutch 22. The levers 66 are pivotally anchored to the cylindrical member 65 by respective pins 67. When these levers 66 are pivoted counter-clockwise as viewed in Fig. 2, heel portions 68 thereof are brought to bear against the pressure ring 59 to force the same rearwardly for engaging the clutch 22 by compressing the clutch plates between this ring and the pressure plate 57. Such rotation of the clutch engaging levers 66 is brought about by a set of pins 69 of which one pin of this set is shown in Figs. 1 and 2. These pins 69 are anchored in and are distributed circumferentially about a shifter ring 70 and project radially inwardly therefrom into slots 71 in the cylindrical member 65. As the shifter ring 70 and pins 69 are shifted rearwardly these pins cam along an edge 72 of the levers 66, said pins 69 being advanced far enough rearwardly in the slots 71 to eventually pass beyond the camming edges 72 and into registry with straight edge portions 73 of their respective levers and in which position the pressure angle between said surfaces 73 and the pins 69 will be such that the coefficient of friction between these parts will be sufficient for preventing accidental displacement of the pins 69 forwardly by reactive force from the pressure ring 59 upon the heel portions 68 of said levers. When the pins 69 occupy this rearward position the clutch 22 will of course be engaged.

The levers 75 in the second set, for engaging the clutch 23, are disposed alternately with the levers 66 within the annular space between the shifter ring 70 and the cylindrical member 65. Pins 76 corresponding to the pins 67 pivotally connect the levers 75 with the cylindrical member 65 while a second set of pins 77 corresponding to the pins 69 and projecting inwardly from circumferentially spaced positions about the back end of the shifter ring 70 are slidably received in axial slots 78. It will be seen therefore that when the shifter ring 70 is shifted forwardly that the pins 77 will coact with camming edges 79 upon the back ends of the levers 75 for rotating these levers counter-clockwise, as viewed in Fig. 2, about the pins 76 and for causing the heel portions 80 of said levers to shift the pressure ring 59a forwardly for pressing the clutch plates 52a and 53a together in clutch engaging relation. When the shifter ring 70 is moved far enough forwardly for the pins 77 to ride upon straight side portions 81 of the levers 75, the coefficient of friction between the parts 77 and 81 will be sufficient to prevent accidental backward movement of the pins 77 whereby the clutch 23 will remain engaged until force is applied to the ring 70 for moving it backwardly to disengage the clutch. Axial movement of the shifter ring 70 for controlling the clutches 22 and 23 may be effected by a manually controlled shifter fork (not shown) cooperable with a shifter fork groove 82 in the well-known manner.

When the engine is idling, the drive shaft 16 which is fixed for rotation therewith will be rotated at slow speed and since the driven shaft 17 will resist rotation because of its connection with a load, such as the propeller of a boat, the planet carrier 24 will be held against rotation so that the sun gear 44, when rotating conventionally counter-clockwise as viewed from the rear, will cause the planet clusters 29 to rotate clockwise about their individual axes. This clockwise rotation of the planet clusters will cause the sun gear 45 to rotate counter-clockwise at reduced speed with respect to the shaft 16 because of the difference in the diameter ratio of the gears 44 and 33 and the gears 32 and 45. Therefore, while the engine is idling and the clutches 22 and 23 are disengaged the plates 52 and 52a of these clutches will be rotated clockwise at reduced speed. While the parts of the apparatus are so rotating, the operator can effect forward drive of the driven shaft by sliding the shifter ring 70 forwardly for pressing the clutch plates 52a and 53a of the clutch 23 into frictional engagement whereby the plates 53a, which are then rotating at greater speed, gradually increase the speed of the plates 52a until eventually the plates 52a and 53a are clamped relatively non-rotatively together. When this condition occurs the sun gears 44 and 45 will be held against relative rotation whereby the planetary gear unit 21 is converted into a coupling device for connecting the shafts 16 and 17 directly together for rotation in unison, the driven shaft then being driven counter-clockwise as viewed from its back end and at the same speed as the drive shaft 16.

If, while the parts of the apparatus are idling as above described with the clutches 22 and 23 disengaged, the shifter ring 70 is moved backwardly for compressing the clutch plates 52 and 53 together, the plates 52 will be brought gradually to rest as will the sun gear 45 connected therewith through the key members 50, the clutch sleeve member 46 and the sleeve shaft 40. During this deceleration of the sun gear 45 the planet gears 32, which are being rotated clockwise about their individual axes as viewed from the back, will begin to roll about the toothed periphery of the gear 45, causing accelerated clockwise rotation of the carrier 24 and of the driven shaft 17, and after the sun gear 45 comes to rest the speed ratio between the shafts 16 and 17 will reach a definite value determined by the ratio of the gears 44 and 33 and of the gears 32 and 45. The ratio of gear diameter shown is such as causes the planet carrier and the driven shaft 17 to rotate at substantially the same speed as the drive shaft 16. It is to be noted that this drive of the driven shaft is in the reverse direction with respect to that of the drive shaft.

Inasmuch as friction clutches 22 and 23 are employed for establishing the forward and reverse power trains, a quick and convenient shift can be made from either of the power trains to the other simply by moving the shifter ring 70 axially toward the clutch it is desired to engage whereby the then engaged clutch is first released and followed by engagement of the desired clutch. Such reversal in the drive of the driven shaft 17 will be brought about without sudden shock or jar since the driving force in the opposite direction will be applied in non-positive fashion through the friction plates of the clutch being engaged.

In that form of the invention shown in Fig. 3 the gear and shafting arrangement is the same as that above described, one difference being that the drive shaft 16' which corresponds to the shaft 16 is adapted to be connected with an engine crankshaft as 10 in Fig. 1 through a driven member 100 of a coupling device such as a friction clutch or fluid flywheel. In the present instance the driven member 100 is that of a speed responsive or automatic friction clutch of which said driven member 100 becomes drivingly connected with the power source upon attainment of a predetermined minimum speed of the driving part (not shown) of this clutch. It will be understood however that a manually operable friction clutch of conventional construction may be provided between the drive shaft 16' and the power source. Another difference between the second embodiment and the embodiment above described is that jaw clutches 22' and 23' (corresponding to the clutches 22 and 23) are provided for connecting the sleeve shaft 40' (corresponding to the sleeve shaft 40) non-rotatively with the gear box or for rotation with the drive shaft.

Those parts of the second embodiment corresponding to parts in the first embodiment are designated by the same respective reference characters with a prime added, as an expedient for explaining these parts and their functions in lieu of a written description at this point.

It will be understood from the above description that when the shifter ring 70' is slid forwardly in its splined connection 101 with the sleeve shaft 40' for meshing the clutch teeth 102 with the clutch teeth 103 as by means of a shifter fork 104, the clutch 23' will be effective through the shaft 16' and the sleeve shaft 40' for holding the sun gears 44' and 45' against relative rotation to establish the direct forward drive connection between the drive and driven shafts 16' and 17'. It will also be understood from the description of operation of the first embodiment that when the ring 70' is shifted rearwardly for engaging the clutch teeth 105 with the clutch teeth 106, the sleeve shaft 40' and the sun gear 45' will be secured against rotation to cause the driven shaft 17' to be driven reversely with respect to the drive shaft 16', and at substantially the same speed.

Normally in placing either the forward or reverse drive power train in operation the connection of the clutches 22' or 23' will be effected prior to engagement of the main clutch of which the driven member 100 is shown. Following engagement of either clutch 22' or 23' the main clutch will be engaged under manual supervision if it is a manually supervised clutch or it will become automatically engaged or effective for transmitting power to the drive shaft 16', if it is a speed responsive clutch, upon the engine attaining a predetermined minimum speed.

While I have herein shown and described but two preferred embodiments, thought to be fully illustrative of the invention, it should be understood that the invention extends to the other forms, arrangements, structures and details falling within the scope and spirit thereof and not sacrificing all of its material advantages.

I claim:

In a planetary gear unit disposed in driving relation between a drive shaft and a driven propeller shaft coaxial therewith, a casing for said unit, a planet gear carrier disposed in said casing in coaxial relation with said shafts, bearing units at opposite ends of said carrier and mounted in said casing to support the carrier for rotation coaxially with said shafts, said bearing units being of a character preventing axial displacement of the carrier relatively to the casing in either axial direction, a plurality of sets of planet gears spaced circumferentially of the carrier and journalled for rotation therein about axes parallel with the carrier axis, the gears of each set being arranged respectively coaxially with the gears of the other set and respectively connected for rotation therewith about their axes, the driven shaft extending axially outwardly from one end of the unit and being rotatively and axially fixed to the carrier at such end of the unit, the drive shaft extending axially outwardly from the other end of the unit, a sleeve shaft rotatable coaxially about the drive shaft, sun gears respectively rotatively fixed on the drive and sleeve shafts and mutually meshed respectively with the gears of said sets, and means for alternatively connecting the sleeve shaft with the gear casing to hold the sun gear thereon against rotation or connecting said sleeve shaft for rotation with the drive shaft to cause rotation of said sleeve sun gear.

OSCAR H. BANKER.